United States Patent [19]

Carter et al.

[11] 4,223,985
[45] Sep. 23, 1980

[54] METHOD AND APPARATUS FOR PROTECTING A FILM GATE AGAINST DIRT WHILE CHANGING FILMS

[75] Inventors: William D. Carter, Rancho Palos Verdes; Martin S. Mueller, Torrance, both of Calif.

[73] Assignee: Carter Equipment Co., Inc., Lawndale, Calif.

[21] Appl. No.: 923,002

[22] Filed: Jul. 10, 1978

[51] Int. Cl.³ .............................................. G03B 1/52
[52] U.S. Cl. ................................................. 352/222
[58] Field of Search .................. 352/221, 222; 355/76; 353/23, 95; 354/222

[56] References Cited

U.S. PATENT DOCUMENTS

| | | | |
|---|---|---|---|
| 1,172,074 | 2/1916 | Townes | 354/322 |
| 2,890,621 | 6/1959 | Suits | 352/222 |
| 3,457,007 | 7/1969 | Conroy | 352/222 |

Primary Examiner—Monroe H. Hayes

[57] ABSTRACT

A film passing by an aperture of a film gate for purpose of projection or exposure is immersed in a liquid in order to minimize the effect of optical imperfections in or upon the film. When changing from one reel or roll of film to the next sufficient liquid is withdrawn so that the new film can be threaded into the film gate in a dry state; however, the interior glass surfaces of the gate are not permitted to become dry, but instead are continuously washed with liquid so as to prevent the accumulation of particulate matter or other foreign material that would tend to degrade the quality of the image.

8 Claims, 5 Drawing Figures

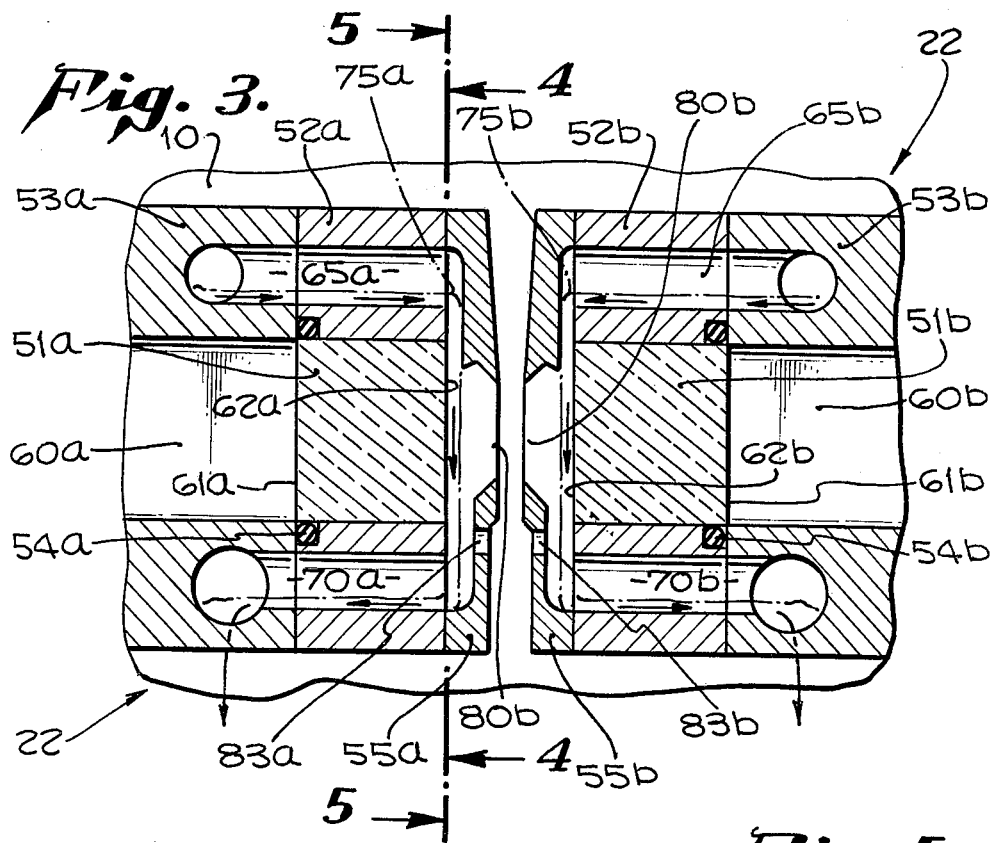
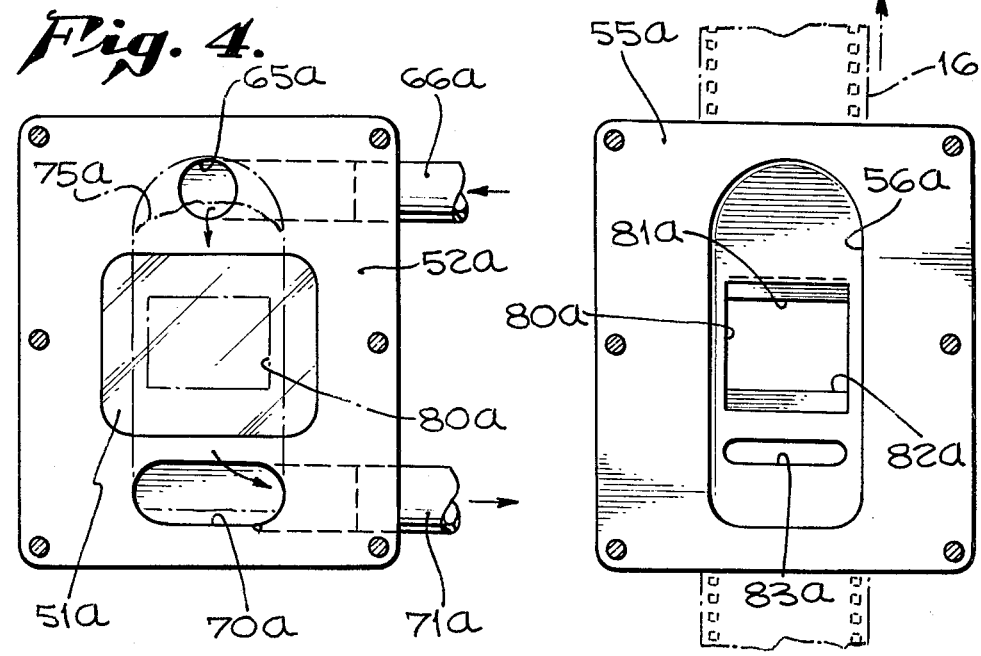

METHOD AND APPARATUS FOR PROTECTING A FILM GATE AGAINST DIRT WHILE CHANGING FILMS

BACKGROUND OF THE INVENTION

The use of liquid immersion for projecting or exposing film has been known and used in the industry for more than two decades. The film is immersed in a transparent liquid having an index of refraction approximately equal to that of the film, and the resulting image is then minimized with respect to the effects of optical imperfections in or upon the film. Apparatus that has been used for this purpose falls generally into three categories, which will be briefly described.

One category of apparatus is the "thin layer" type of machine. The film passes between a pair of pads or applicators which are continuously wetted with the liquid or solvent, thereby applying a thin layer of the liquid or solvent onto each surface of the film. The film remains wetted until it passes by the aperture where exposure or projection takes place, and then the liquid is evaporated before the film is rewound into a roll or reel.

Another type of apparatus is the "total immersion" machine. A large body of liquid not only immerses the film gate that provides the aperture for projection or exposure of the film, but the film is also totally immersed in the liquid for some distance before reaching the aperture. This type of apparatus has been used for some time in step optical printers or projectors. It has only very recently been incorporated into machines in which the film runs continuously, rather than being stepped. Such a liquid immersion machine of the continuous type is shown, for example, in the copending application of the present applicants Ser. No. 791,135 filed Apr. 26, 1977 and now U.S. Pat. No. 4,105,329.

A third type of liquid immersion apparatus is the "aquarium gate", also known as the Ott gate. This gate is constructed with a parallel pair of blocks or panels or glass, with a space between them through which the film passes. A light beam for exposing or projecting the film passes perpendicularly through both blocks or panels of glass and also through the film. On their exterior surfaces the blocks of glass are exposed to air, but on their interior surfaces they are covered with the liquid, which also extends between the two blocks or panels so as to fully surround the film within the printing or projection chamber.

The total amount of liquid used in the aquarium gate is relatively small. A pair of seals are constructed at points just before and just after the aperture, and the liquid body is confined between the seals and the glass walls. This body of liquid does not remain static, but on the contrary there are inlet and outlet conduits which communicate with the liquid chamber, and the liquid is continuously pumped through the chamber and hence continuously flows over the surfaces of the film while the photographic operations are being carried out. One reason for providing continuous flow of the liquid is to minimize the probability that bubbles will enter the chamber; another is to carry away any particulate matter that may have entered with the film; and still a third reason is to eliminate thermoclines, a distortion effect that results from unequal distribution of heat energy within the liquid body.

In all of these types of prior art apparatus there has been a problem, which we have now come to recognize, and upon which our invention is based. This problem is that, while the liquid immersion apparatus functions very well from the beginning to the end of a particular reel or roll of film, it does not necessarily function well when changing to the next reel or roll.

When a new reel or roll of film is to be threaded into the machine, it is first necessary to withdraw the liquid or solvent from the printing or projection chamber. This is true because it is necessary to thread the next film into the machine in a dry state, in order to protect the operator from chemical effects of the solvent. This procedure has, apparently, been universally used throughout the industry. Unfortunately, however, withdrawal of the liquid or solvent exposes clean surfaces to the air, and provides a new opportunity for accumulation of particulate matter or other kinds of dirt. The necessary cleaning operations, and steps taken to avoid the dirt, have caused considerable down time of the apparatus while changing from one roll or reel of film to the next, and have also resulted in significant amounts of scrap or wastage when improperly performed.

The object and purpose of the present invention, therefore, is to extend the benefits of liquid immersion techniques to the change-over from one roll or reel of film to the next. More specifically, it is the object and purpose of the invention to make it unnecessary to engage in extensive cleaning of the apparatus before resuming the photographic operations.

SUMMARY OF THE INVENTION

According to the present invention the change-over from one roll or reel of film to the next is accomplished in the following manner. The liquid or solvent is withdrawn from the machine to the extent that is necessary in order to thread the film into the machine in a dry state. However, the surfaces most critical to the photographic operation and most subject to the accumulation of dirt are not permitted to become dry. Rather, they are maintained in a wetted condition with continuous streams of liquid flowing over them. Thus, any particulate matter carried in by the air and falling towards those surfaces will immediately be carried away by the moving liquid, before it has an opportunity to adhere or stick to the corresponding surface.

Specifically, the presently illustrated embodiment of the invention may for convenience be aptly referred to as the "waterfall gate". That is, when the gate is otherwise dry so that new film can be threaded into it, continuous streams of liquid run like waterfalls over the interior optical surfaces of the glass blocks or panels of the gate.

DRAWING SUMMARY

FIG. 3 is a view like FIG. 2 but with the film being absent, the liquid body being absent, and the interior surfaces of the glass blocks or panels being covered by the waterfalls of the present invention;

FIG. 4 is an elevation view of the gate taken on line 4—4 of FIG. 3; and

FIG. 5 is an elevation view of the gate taken on line 5—5 of FIG. 3.

PREFERRED EMBODIMENT

Figures 1, 2:
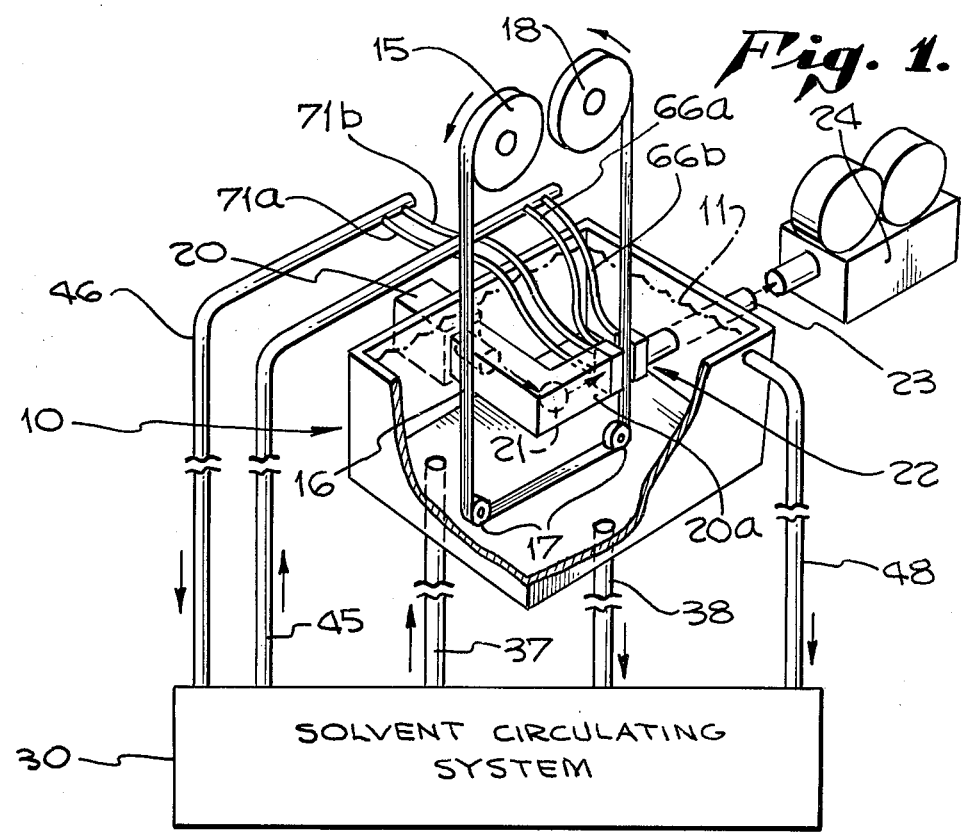
FIG. 1 is a perspective view, largely schematic, of a step optical printer in accordance with the present invention.
FIG. 2 is a cross-sectional elevational view of the gate of FIG. 1, showing the film moving through the gate and with both the gate and the film being fully immersed in a body of liquid.

Reference is now made to FIG. 1 illustrating a step optical printer into which the method and apparatus of the present invention have been incorporated.

Thus a printing tank 10 is filled with a body 11 of liquid or solvent. The film 16 is payed out, guided, transported, and taken up by a transport mechanism of a conventional nature. In the present drawings the entire transport mechanism is schematically represented by payout reel 15, guide rollers 17, and take-up reel 18.

A light source 20 that is external to one of the side walls of the tank generates a light beam 50 which passes through the interior of the tank to a reflector 21, where it is reflected into and through a gate 22. The light beam does not pass through the solvent, but through an air-filled housing 20 a. The only solvent in the optical path is in the space between the glass blocks. Film 16 passes through the gate 22 before being received upon the take-up reel 18. After passing through the gate the light beam then travels through a lens 23, mounted external to the tank, and then continues to a camera 24. Camera 24 contains a shutter mechanism, not specifically shown.

The hydraulic system for supplying liquid or solvent to the printing tank 10 and to the gate 22 will now be described. A solvent circulating system 30 which is located external to printing tank 10 includes, amongst other things, a reservoir, a pump, a filter, a bubble trap, and numerous valve arrangements. The valve arrangements are controlled in such manner as to achieve the operations that will now be described.

The tank is initially filled with liquid supplied from circulating system 30 through the main supply line 37. The liquid body 11 fills the tank to near its top, where an overflow line 48 is attached to the side of the tank. When the overflow level is reached the pump of the circulating system continues to pump liquid into the tank so that it continuously circulates through the tank and then is returned to the system through the overflow line 48.

When printing tank 10 is to be emptied of liquid a main drain line 38 attached to the bottom of the tank is activated for that purpose. The incoming supply of liquid from the supply line 37 is shut off at the same time.

A separate waterfall supply line 45 supplies liquid to the internal structure of the waterfall gate 22, as will later be described in detail. The line 45 has separate branches 66a, 66b which serve the respective sides of the gate 22. Liquid is pumped continuously through the waterfall line 45, not only when photographic operations are being performed, but also while changing from one reel or roll of film to the next.

Also associated with gate 22 is a waterfall return line 46, which has corresponding separate outlet tubes 71a, 71b for the respective sides of the gate. While the waterfall lines 45, 46 and their accompanying attachment tubes are shown in FIG. 1 as being elevated above the tank, this is only for purpose of convenience of illustration, and in actual fact the supply line 45 enters a side wall of the tank while return line 46 exits from the side wall at even a lower elevation.

Reference is now made to FIGS. 2-5 which illustrate the details of the gate structure.

A main component of the gate 22 is a parallel pair of glass plates or panels 51a, 51b which are spaced in parallel relationship. The film 16 moves vertically between the two plates or panels but does not touch either of them. Light beam 50 follows a horizontal path as shown in FIG. 2 and passes perpendicularly through both of the glass plates 51a, 51b as well as through the film 16. During the time when a particular reel or roll of film is passing through the apparatus, the entire gate structure as well as the adjacent portions of the film 16 is completely immersed in the liquid body 11, as shown in FIG. 2. Thus the respective interior surfaces 62a, 62b of the glass plates are continuously washed by the liquid. It will be noted that due to the operation of the pump the liquid body is not static, but provides a continuous circulation around and through the structure of the gate. Each of the glass plates 51a, 51b is surrounded by a corresponding metallic support frame 52a, 52b which also supports it. A backing frame 53a, 53b is attached on the rearward side of each corresponding support frame. In the particular structure illustrated, the outer glass surface 61a is subjected to air space 60a while outer glass surface 61b is subjected to air space 60b. Glass plate 51a is sealed within support frame 52a by means of O-ring 54a, and plate 51b is sealed in support frame 52b by O-ring 54b. Glass panel 51b forms part of the outer wall of printing tank 10.

On the interior side of each glass plate there is a corresponding metal aperture or guide plate 55a, 55b, which aperture plates are attached to and supported from the corresponding support frames. As best seen in FIG. 5 one of the functions of the aperture plates is to form corresponding windows 80a, 80b which cooperatively define the photographic aperture by which the film 16 passes, and through which the light beam 50 passes.

The upper portion of support frame 52a and the upper portion of back frame 53a have communicating cavities therein which cooperatively provide an inlet chamber 65a. Inlet tube 66a is coupled to the inlet chamber 65a. The lower portion of support frame 52a and the lower portion of back frame 53a have communicating cavities which cooperatively form an outlet chamber 70a. Fluid continuously provided by the waterfall line 45 flows into tube 66a and chamber 65a, and then is guided by interior cutout 56a of guide frame 55a to flow like a water fall in a continuous sheet 75a which covers the internal surface 62a of glass plate 51a. The waterfall is also guided by the lower portion of aperture or guide frame 55a so that it enters the outlet chamber 70a, from whence it enters return tube 71a, as shown in FIG. 4.

In similar fashion, an inlet chamber 65b and an outlet chamber 70b are cooperatively provided by the support frame 52b and back frame 53b. Liquid flowing in from the inlet tube 66b therefore provides a similar waterfall 75b which, after passing through the outlet chamber, enters return tube 71b.

It is preferred to supply liquid continuously to the inlet tubes 66a, 66b at all times, including the times when a roll or reel of film is moving through the apparatus and the gate is entirely immersed in the liquid body 11. However, if so desired the controls may be arranged in such manner that after a new film is threaded into the apparatus, and the tank is filled with liquid which is then being circulated through the tank by the action of pump 32, the separate sources of fluid supply for the waterfalls may be temporarily shut off. If so, however, the waterfalls should again be activated prior to the time that the tank is drained, so that the inner glass surfaces 62a, 62b will be continuously washed with the liquid or solvent.

The inner surface of aperture or guide plate 55a is shown in FIG. 5. Around its periphery it is bolted or otherwise tightly fastened to the support frame 52a, so as to form an essentially leak-proof structure. In its central portion it is hollowed at 56a near its upper end to provide the interior end of inlet chamber 65a and at its lower end to provide the interior extremity of the outlet chamber 70a. The central window 80a has an upper border 81a and lower border sectional configuration, as seen in FIG. 2 or FIG. 3. The purpose of these particular configurations is to provide a proper dynamic flow of the liquid body 11, while the film is traveling through the gate.

Also shown in FIG. 5 is a lower port 83a formed by the aperture plate 55a, beneath the level of the lower border 82a. The purpose of this port is to permit liquid that is pumped into the tank from the main source, i.e., through the main inlet line 37, to flow into and through the outlet chamber 70a without creating undesirable turbulence in the vicinity of the aperture.

It will be seen that the aperture plate 55b is constructed similarly to the aperture plate 55a, having upper and lower borders 81b, 82b which cooperatively form the window 80b, and having a bottom port 83b.

OPERATION

As shown in FIG. 5 the film 16 may have perforations on both edges, but if so, the film is of sufficient width and is so positioned that the perforations do not pass through the aperture that is provided by the windows 80a, 80b. Alternatively, the film may be of a type which has only a single perforation strip on one of its edges.

One of the functions of the aperture plates 55a, 55b is to guide the film when it is initially threaded into the machine in such manner that the film can be kept dry by keeping it out of contact with the waterfalls 75a, 75b. It is not essential, however, that the aperture plates be a permanent part of the gate, and if desired a removable type of guide frame may be utilized that will be employed at the time that the dry film is threaded into the machine, and will then be removed before the photographic operations are commenced.

As a further alternative, the aperture plate structure may be omitted altogether, although admittedly this may result in some difficulty in keeping the film dry while it is being threaded into the machine.

In the particular embodiment here illustrated the gate 22 has a generally symmetrical structure which is similar on both sides. It should be understood, however, that in some machines there may be reasons for making the gate structure more non-symmetrical. In that event it may become necessary to utilize the waterfall method of the present invention on only one side of the gate. Thus it is fully within the contemplation of the present invention that only a single waterfall may be utilized in a particular instance.

While particular apparatus has been illustrated for creating the waterfall it will nevertheless be understood that many variations and modifications are possible, and that it is within the intent and purpose of the present invention to provide suitable means for generating the waterfall of the present invention, by whatever specific mechanism may be found most appropriate.

ALTERNATE FORMS

In the presently preferred embodiment of the invention as here illustrated, the invention is applied to a step optical printer of the total immersion type. It should be understood, however, that the illustrated machine may be modified to operate as a step contact printer, by inserting a shutter between the light source and the gate. In that form of the machine the present invention is utilized in the same manner as described above and provides the same benefits and advantages.

Although not specifically illustrated in the present drawings, the invention may also be applied to a gate of the aquarium type. For this purpose the aquarium gate may be equipped with a dual fluid circulation drive system, one part of the system operating with a volume of fluid which is driven into and through the space through which the film passes, while another part of the system generates a smaller fluid flow that provides the waterfall of the present invention. Due to the different dynamics in the aquarium gate the specific design of aperture plates or guide frames are preferably not in accordance with the present drawings, but are modified in an appropriate manner.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. An apparatus used in connection with the passing of film through a film gate while immersed in or surrounded by a liquid wherein the gate has surfaces that need to be protected from accumulating dirt thereon when the film gate is removed from the liquid in which it is immersed during the process of changing from one reel or roll of film to the next, said apparatus comprising:

container means for housing said apparatus;

a first transparent vertically disposed member having an upper end, a lower end, an outer surface and an inner surface, having its outer surface embedded in one wall of said container means and having its inner surface parallel to and spaced from one surface of the film;

a second transparent vertically disposed member having an upper end, a lower end, an outer surface and an inner surface, having its inner surface parallel to the inner surface of said first transparent member, and spaced from the opposite surface of the film so that the film is equidistant from the inner surfaces of said first and second transparent members;

means for continuously supplying one stream of liquid to the upper end and inner surface of said first transparent member and another stream of liquid to the upper end and inner surface of said second transparent member so that a sheet of liquid continues to run down over each of said inner surfaces and to cover the same like a waterfall; and guide frame means cooperatively associated with the inner surfaces of said transparent members and positioned outside of said waterfalls, for guiding a new film when inserted into the guide frames so that the new film may be inserted in a dry state despite the continuous operation of said waterfalls.

2. An apparatus described in claim 1, wherein both of said transparent members are made of glass.

3. In passing film while immersed or surrounded in liquid through a film gate, wherein the gate has surfaces that need to be protected from accumulating dirt thereon, the method of changing from one reel or roll of film to the next characterized by the steps of:
- continuously supplying streams of liquid to the corresponding surfaces of the gate which need protection from dirt, so that they will be continuously washed with liquid during the changing of the film as well as during the running of a particular reel or roll of film;
- utilizing a main source of liquid for immersing the film;
- whenever the film is to be changed, withdrawing the liquid supplied by the main source, so that the new film may be threaded in a dry condition into the film gate; and
- when the new film has been threaded into the gate, again immersing the film from said main source of liquid.

4. A method of projecting or exposing successive rolls of film in a film gate having a spaced pair of optical surfaces, comprising the steps of:
- (a) aligning the gate so that said surfaces are substantially vertical;
- (b) placing the film of one of the rolls between said surfaces;
- (c) immersing the film and said surfaces in a body of liquid;
- (d) advancing the film of said one roll through the gate until it is projected or exposed, and then removing it;
- (e) applying corresponding separate streams of liquid to said optical surfaces so as to run downward over them and keep them continuously wet, and then removing said body of liquid within which the film was previously immersed so as to leave a dry space between said liquid streams;
- (f) inserting the film of another roll into said dry space; and
- (g) thereafter filling said dry space with a body of liquid merging with said streams, so as to immerse the newly inserted film and provide an entirely liquid optical path between each surface of the film and the associated optical surface of the film gate.

5. A film gate comprising:
- a pair of glass blocks spaced apart in parallel relationship
- separate means cooperatively associated with each of said glass blocks for supplying a continuous stream of liquid to the upper extremity of the inner surface thereof so that each of said inner surfaces is covered by a sheet of liquid which continues to run down over it like a waterfall; and
- guide frame means cooperatively associated with the inner surfaces of said glass blocks for guiding a new film when inserted between the blocks so that it may be inserted in a dry state despite the continuous operation of said waterfalls;
- said guide frame means including a pair of separate guide frames spaced inwardly from corresponding ones of said blocks for receiving the film therebetween, said guide frames also having aligned openings providing an aperture.

6. In passing film by an aperture of a film gate wherein the film is projected or exposed, which gate has an optical surface spaced from one surface of the film, and while that space is filled with a liquid having an index of refraction approximately equal to that of the film, the method of changing from one reel or roll of film to the next so as to minimize dirt on the optical surface that would tend to degrade the quality of the image, comprising the steps of:
- (a) when one reel or roll of film is removed from the gate, removing the liquid from a portion of said space previously occupied by the film, but not from said optical surface;
- (b) continuously supplying a stream of liquid to the upper end of said optical surface so that a sheet of liquid continues to run down over it and to cover it like a waterfall, but without entering said space previously occupied by the film;
- (c) threading the next roll or reel of film into the gate so as to occupy said space; and
- (d) then filling all of the remainder of said space with liquid so that a continuous body of liquid again extends between said optical surface and the one surface of the film.

7. The method of claim 6 utilized in conjunction with a film gate having a pair of optical surfaces spaced from corresponding surfaces of the film in which a pair of continuous streams of liquid are supplied to corresponding ones of said optical surfaces so as to produce respective waterfalls thereon.

8. The method of claim 6 in which a guide frame is positioned outside of said waterfall, and the film is threaded over the outer surface of said guide frame so as to keep the film dry.

* * * * *